(12) United States Patent
Wang

(10) Patent No.: US 10,757,377 B2
(45) Date of Patent: Aug. 25, 2020

(54) SURVEILLANCE SYSTEM AND OPERATION METHOD THEREOF

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 0 days.

(21) Appl. No.: 15/608,109

(22) Filed: May 30, 2017

(65) Prior Publication Data

US 2017/0353699 A1 Dec. 7, 2017

Related U.S. Application Data

(63) Continuation-in-part of application No. 15/371,909, filed on Dec. 7, 2016.

(30) Foreign Application Priority Data

Jun. 1, 2016 (TW) .............................. 105117190 A

(51) Int. Cl.
*H04N 7/18* (2006.01)
*G06K 9/00* (2006.01)
(Continued)

(52) U.S. Cl.
CPC ......... *H04N 7/188* (2013.01); *G06K 9/00771* (2013.01); *G08B 13/19602* (2013.01);
(Continued)

(58) Field of Classification Search
CPC ................................ H04N 7/188; G08B 7/062
See application file for complete search history.

(56) References Cited

U.S. PATENT DOCUMENTS 6,970,183 B1 * 11/2005 Monroe .................. G08B 7/062
348/143
7,302,089 B1 11/2007 Smits
(Continued)

FOREIGN PATENT DOCUMENTS

CN 102236407 A 11/2011
CN 103425238 A 12/2013
(Continued)

OTHER PUBLICATIONS

A survey on visual surveillance of Object motion and behaviors; Hu—2004.*

(Continued)

*Primary Examiner* — Luis Perez-Fuentes
(74) *Attorney, Agent, or Firm* — Li & Cai Intellectual Property (USA) Office

(57) ABSTRACT

The disclosure is related to a surveillance system and an operation method thereof. The surveillance system includes an auxiliary sensor module that is in full-time operation, and a main sensor module that is in a power-saving mode at a normal state. The main sensor is in operation only if the signals generated by the auxiliary sensor module meet a criterion of surveillance. The surveillance system can reduce power consumption since the more powerful main sensor module stays in the power-saving mode without actuation. The surveillance system can process the surveillance data generated by the auxiliary sensor module since it adopts the steps of ROI detection, feature extraction, and object recognition in an early stage of a whole surveillance process.

14 Claims, 7 Drawing Sheets

(51) Int. Cl.
*H04N 5/232* (2006.01)
*G08B 13/196* (2006.01)

(52) U.S. Cl.
CPC ... *G08B 13/19695* (2013.01); *H04N 5/23241* (2013.01); *H04N 5/23245* (2013.01); *H04N 7/18* (2013.01)

(56) References Cited

U.S. PATENT DOCUMENTS

| | | | |
|---|---|---|---|
| 7,806,604 | B2 | 10/2010 | Bazakos et al. |
| 9,063,574 | B1 | 6/2015 | Ivanchenko |
| 9,578,159 | B2 * | 2/2017 | Muthukumar ........ H04W 12/06 |
| 9,603,524 | B2 * | 3/2017 | Park .................... A61B 5/0205 |
| 2004/0212678 | A1 | 10/2004 | Cooper et al. |
| 2006/0170769 | A1 * | 8/2006 | Zhou .................. G06K 9/00362 |
| | | | 348/143 |
| 2006/0215022 | A1 | 9/2006 | Damabhorn |
| 2006/0220843 | A1 * | 10/2006 | Broad .................. G08B 25/009 |
| | | | 340/539.23 |
| 2007/0035627 | A1 * | 2/2007 | Cleary ............ G08B 13/19608 |
| | | | 348/159 |
| 2007/0039030 | A1 * | 2/2007 | Romanowich ... G08B 13/19608 |
| | | | 725/105 |
| 2007/0132846 | A1 * | 6/2007 | Broad .................... G08B 25/10 |
| | | | 348/143 |
| 2011/0279683 | A1 | 11/2011 | Yarmchuk et al. |
| 2013/0108107 | A1 | 5/2013 | Kang et al. |
| 2013/0113955 | A1 | 5/2013 | Li |
| 2013/0135499 | A1 | 5/2013 | Song |
| 2014/0055387 | A1 | 2/2014 | Yeh |
| 2014/0128032 | A1 | 5/2014 | Muthukumar |
| 2014/0221051 | A1 | 8/2014 | Oguri |
| 2016/0212329 | A1 | 7/2016 | Choe et al. |
| 2016/0360097 | A1 | 12/2016 | Penha et al. |
| 2016/0360116 | A1 | 12/2016 | Penha et al. |
| 2016/0360382 | A1 * | 12/2016 | Gross .................... G06F 3/0488 |
| 2017/0169295 | A1 | 6/2017 | Park et al. |
| 2017/0351908 | A1 | 12/2017 | Wang et al. |
| 2018/0120935 | A1 | 5/2018 | Kim et al. |
| 2019/0037173 | A1 | 1/2019 | Lee et al. |

FOREIGN PATENT DOCUMENTS

| | | |
|---|---|---|
| CN | 103631508 A | 3/2014 |
| CN | 104115485 A | 10/2014 |
| CN | 105141744 A | 12/2015 |
| WO | 2014124663 A1 | 8/2014 |

OTHER PUBLICATIONS

NPL: A survey on visual surveillance of Object motion and behaviors; Hu et al,—2004.*
NPL: Real-time multi-target tracking by a cooperative distributed vision system; Takashi; 2002.*
A survey on visual surveillance of Object motion and behaviors; Hu et al,—2004. (Year: 2004).*
Real-time multi-target tracking by a cooperative distributed vision system: Takashi; 2002 (Year: 2002).*
Survey on visual surveillance of Object motion and behaviors; Hu et al,—2004. (Year: 2004).*
Mohammed E. Fathy, et al; "Face-Based Active Authentication on Mobile Devices", Center for Automation Research, University of Maryland, College Park, MD 20742, 20152.
Takashi Matsuyama, et al; "Real-Time Multitarget Tracking by a Cooperative Distributed Vision System", Invited Paper, Proceedings of the IEEE, vol. 90, Jul. 7, 2002, p. 1136-p. 1150.
Google search; 2019.
Google Search results.
Antonio Hard, et al., "Mobile Camera-Based Adaptive Viewing", University of Canterbury, Christchurch, New Zealand, 2005.
Helene Brashear, et al., "Using Multiple Sensors for Mobile Sign Language Recognition", Georgia Institute of Technology, Atalanta Georgia, ETH—Swiss Federal Institute of Technology, Zurich, Switzerland, 2003.

* cited by examiner

SURVEILLANCE SYSTEM AND OPERATION METHOD THEREOF

CROSS REFERENCE TO RELATED APPLICATIONS

This patent application is a continuation-in-part of U.S. patent application Ser. No. 15/371,909, titled 'PORTABLE ELECTRONIC DEVICE AND OPERATION METHOD THEREOF' filed Dec. 7, 2016.

BACKGROUND OF THE INVENTION

1. Field of the Invention

The instant disclosure relates to a surveillance system and a method thereof, and in particular, to a surveillance system which adopts an auxiliary sensor and a main sensor to perform multi-stage detection, and an operation method thereof.

2. Description of Related Art

In a conventional video-based surveillance system, a DVR (digital video recorder) is used to monitor an area where the system is installed. The DVR records the images captured by a camera connected with the DVR. Due to security concerns, the camera and the DVR are required to be turned on always in order to implement a full-time monitoring. However, the arrangement of the conventional surveillance system will spend a lot of storage space for storing the huge amount of audio/video content.

To reduce the storage space of the surveillance data, the conventional surveillance system needs to reduce the amount of the data by downgrading the quality of the audio/video content. For example, the resolution of the videos can be decreased, so that the surveillance system can store the data with lower quality. Alternatively, the system can abandon data that do not harbor security concerns through a post-processing procedure.

There is a known technique using a trigger sensor in a surveillance system. When anything enters a region of interest, the trigger sensor can be triggered to turn on the camera of the DVR for capturing images of the area. However, the conventional surveillance system still lacks an efficient way to discern which contents can be discarded, and which contents are meaningful enough to store in the storage.

SUMMARY OF THE INVENTION

The disclosure herein is related to a surveillance system and an operation method thereof. One of the objectives of the surveillance system is to provide an efficient method of surveillance and a system with power-saving scenario.

In one general aspect of the present disclosure, the surveillance system includes an auxiliary sensor module that is in full-time operation for outputting sensed signals from a scene, a motion-detection engine detecting a movement in the scene based on the sensed signals, an object-detection engine detecting an object in the scene based on the movement to be detected by the motion-detection engine, and a main sensor module. Implementations may include one or more of the following features. The main sensor module is in a power-saving mode when the system is at a normal state. The surveillance system in the normal state does not receive signals meeting any criterion of surveillance defined by the system. In one embodiment, when there is no object to be detected in the scene, the main sensor module is in a power-saving mode, but when an object is detected by the object-detection engine, the main sensor module is activated to perform a surveillance function.

In another aspect of the present disclosure, the auxiliary sensor module includes an image sensor that can be a low-resolution image sensor. The motion-detection engine or the object-detection engine is implemented by hardware or a series of software instructions executed by a processor of the surveillance system. The main sensor module includes a main sensor that can be a high-resolution image sensor.

In another aspect of the present disclosure, the object-detection engine includes an ROI detector used to determine an ROI based on images captured by an image sensor of the auxiliary sensor module, a feature extractor used to extract features in the ROI based on the images, and an object recognizer used to recognize the object in the scene according to the features extracted from the image.

In another aspect of the present disclosure, an operation method of a surveillance system is provided. In the method, the system detects a movement in a scene based on the signals sensed by the auxiliary sensor module which is in full-time operation, and detects an object in the scene based on the movement to be detected. The main sensor module of the system is activated from a power-saving mode for performing surveillance function when the object is detected in the scene.

In one further aspect of the present disclosure, in the step of detecting the object in the scene, an ROI is determined based on the low-resolution images, and features in the ROI can be extracted based on the images. Further, when the object has been recognized, the main sensor module is activated for surveillance use.

For further understanding of the instant disclosure, reference is made to the following detailed description illustrating the embodiments of the instant disclosure. The description is only for illustrating the instant disclosure, and not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Figure 1:
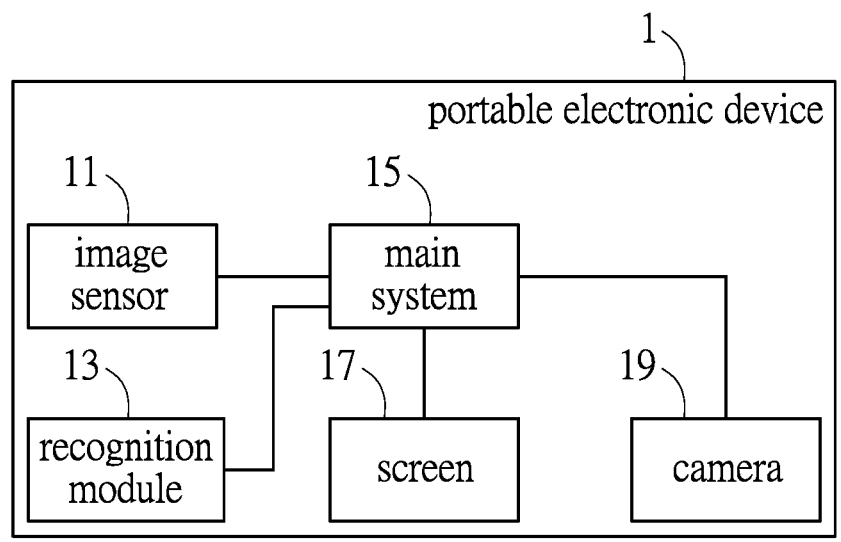
FIG. 1 shows a block diagram of a portable electronic device of one embodiment of the instant disclosure.
Figure 2:
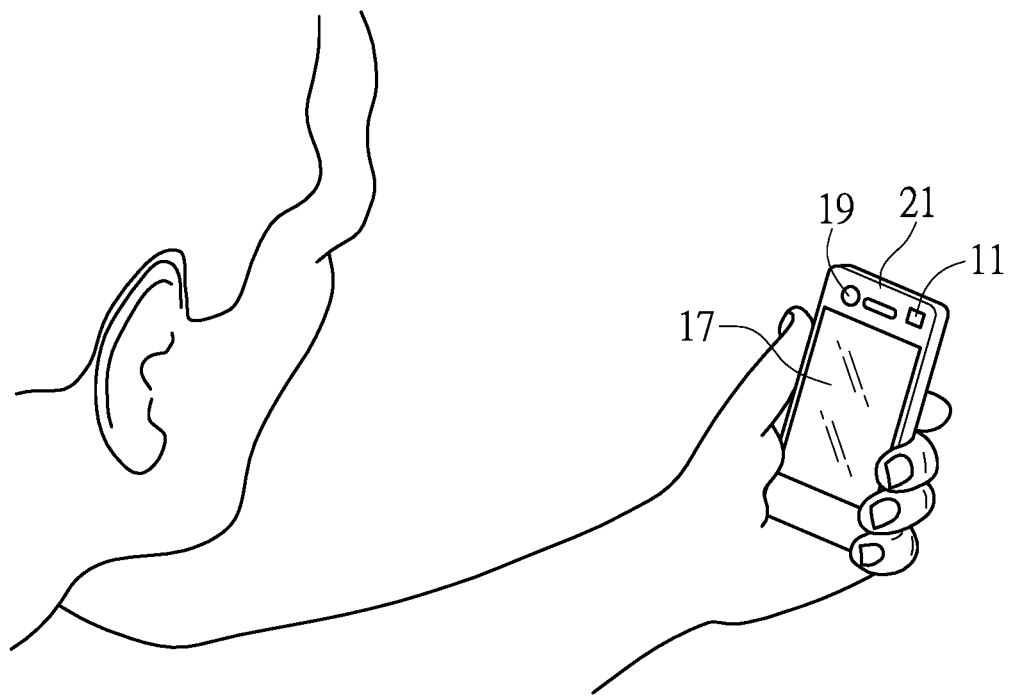
FIG. 2 is a schematic diagram showing how the portable electronic device shown in FIG. 1 operates.

Referring to FIG. 1 and FIG. 2, FIG. 1 shows a block diagram of a portable electronic device of one embodiment of the instant disclosure, and FIG. 2 is a schematic diagram showing how the portable electronic device shown in FIG. 1 operates. The portable electronic device 1 mainly includes an image sensor 11 and a recognition module 13. The image sensor 11 and the recognition module 13 can be implemented only by hardware or by a combination of hardware and firmware or software, and is not limited to that disclosed herein. In addition, as shown in FIG. 1, the portable electronic device 1 can also include a main system 15, a screen 17 and a camera 19, which are respectively connected to the main system 15.

The portable electronic device 1 can be a mobile communication device, a personal digital assistant (PDA), a tablet or the like, and is not limited herein. For example, the components included in the portable electronic device 1 can also be implemented in a surveillance system that can be installed in any area or occasion requiring surveillance. A mobile communication device is taken as an example of the portable electronic device 1 shown in FIG. 2. The portable electronic device 1 further has a body 21. The image sensor 11, the screen 17 and the camera 19 can be exposed on the same surface which forms part of the housing of the body 21, but is not limited herein. The recognition module 13 and the main system 15 are configured inside the body 21. The positions where the image sensor 11, the screen 17 and the camera 19 are configured are not limited by that shown in FIG. 2. That is, the positions where the image sensor 11, the screen 17 and the camera 19 are configured can be designed based on need.

The portable electronic device 1 can be operated in a suspend state and a work state. When the portable electronic device 1 is in the work state, the screen 17 of the portable electronic device 1 can be turned on and the main system 15 can be activated to perform a function or a service required by a user according to the user's instruction. In addition, when the portable electronic device 1 is not in work for a period of time, the portable electronic device 1 can be switched to the suspend state automatically. Thus, the power supply to the main system 15 is temporarily cut. In the meanwhile, e.g. as when entering the suspend state, the main system 15 enters a power-saving mode so that the screen 17 is turned off to reduce power consumption of the portable electronic device 1 until the portable electronic device 1 is again in operation under the work state.

Specifically speaking, the image sensor 11 can be an always-on image sensor that requires small current for basic functionality. In an exemplary example, the image sensor 11 can be used to analyze the low-resolution image under low power consumption. Even when the portable electronic device 1 is in the suspend state, the image sensor 11 in one aspect of the invention can be still turned on to constantly capture a series images, e.g. the environmental images named a first image, outside of the body 21 and to detect whether or not any face image information exists in the first image. The first image has a first resolution. For the purpose of unlocking the screen 17, e.g. switching the portable electronic device 1 to the work state, the image sensor 11 and the screen 17 are activated to be in operation. In this manner, the image sensor 11 constantly captures the images that are displayed on the screen 17 of the portable electronic device 1. As shown in FIG. 2, the user can unlock the screen 17 when wishing to use the portable electronic device 1 to perform a function or a service (at this moment, the portable electronic device 1 is still in the suspend state). The image sensor 11 is turned on for capturing and detecting the first image outside of the body 21 if the portable electronic device 1 is unlocked. Optionally, the image sensor 11 can also be an always-on sensor even though before the portable electronic device 1 is unlocked. When any information relating to a human face is detected from the first image, the image sensor 11 accordingly outputs an actuation signal to the main system 15. After that, the camera 19 and the recognition module 13 are activated by the main system 15.

To prevent the image sensor 11 from erroneously detecting a face from the first image, additional image sensors 11 can be used. Thus, additional conditions relating to determining whether the face image information is correctly detected from the first image can be added. For example, when any face image information in the first image is detected by the image sensor 11, the image sensor 11 is required to make sure that the face image information has been found for over a period of time, for example, two seconds. Accordingly, the actuation signal is generated by the image sensor 11 and transmitted to the main system 15 only if the image sensor 11 detects the face image information in the first image and the face image information has appeared lasting for the determined period of time. After that, the main system 15 activates the camera 19 and the recognition module 13. The conditions to determine whether or not the face image information is correctly detected from the first image are not limited herein or used to restrict the instant disclosure.

The portable electronic device 1 is originally in the suspend state. After the face image information in the first image is detected by the image sensor 11, the camera 19 of the portable electronic device 1 is activated to take the environmental images, named a second image, outside of the body 21. The second image has a second resolution that is configured to be higher than the first resolution of the first image. The recognition module 13 is configured to recognize at least one facial feature in the second image. The recognition module 13 is connected to the main system 15. The recognition module 13 can be activated by the main system 15 to recognize at least one facial feature in the second image taken by the camera 19. The camera 19 can be a camera with higher resolution built in the portable electronic device 1. Compared with the image sensor 11, the camera 19 can provide images with higher resolution, e.g. the second image. The camera 19 is considered to be a front camera of the portable electronic device 1, as shown in FIG. 2. It should be noted that the second image captured by the camera 19 is of the scene in front of the screen 17 of the portable electronic device 1. After the face image information is detected from the first image, the main system 15 of the portable electronic device 1 turns on the camera 19 to capture the second image. The second image is such as the scene in front of the screen 17. After that, the recognition module 13 recognizes at least one facial feature in the second image.

When the recognition module 13 recognizes at least one correct facial feature from the second image, the recognition module 13 judges whether or not the user has an authorized identification to use the portable electronic device 1, e.g. to perform any function or any service on the device 1. The main system 15 leaves the power-saving mode and the screen 17 is unlocked when the user has been identified. Thus, the portable electronic device 1 is switched from the suspend state to the work state for performing a function or a service. On the other hand, if the recognition module 13 has not yet correctly recognized an authorized facial feature, the portable electronic device 1 will not be switched from the suspend state to the work state and the screen 17 will not be turned on. This aspect allows the device 1 to deny an unidentified user, e.g. without authorized identification, to use the portable electronic device 1 for performing any function or any service. Details about the mechanism for recognizing facial features are easily understood by those skilled in the art and thus will not be described herein.

One of the main achievements of the portable electronic device 1 is that, the built-in image sensor 11 can constantly capture and detect any face image information in the first image, and then determine whether or not to turn on the camera 19 to capture the second image with higher resolution. After that, the recognition module 13 detects at least one facial feature in the second image. In this manner, the unlocking mechanism of the portable electronic device 1 can be implemented by a two-stage face recognition, which can effectively reduce the power consumption of the portable electronic device 1.

More specifically, the first-stage face recognition is to use the image sensor 11 that is always on to determine whether or not any face image information can be detected in the first image, and accordingly determine whether or not to start the second-stage face recognition. In the second-stage face recognition, the portable electronic device 1 turns on the camera 19 to capture images with higher resolution and activates the recognition module 13 to analyze the high-resolution images, so as to determine whether or not the user has an authorized identification to operate the portable electronic device 1.

When the portable electronic device 1 is switched from the suspend state to the work state, the image sensor 11 is switched to the power-saving mode. The image sensor 11 is previously turned on to capture and detect the first image outside of the body 21 in full time until the portable electronic device 1 has been switched from the work state to the suspend state. The image sensor 11 enters the power-saving mode if it has not been operated for a certain period of time. In addition, when the portable electronic device 1 is operated in the suspend state and the image sensor 11 has not yet detected the face image information from the first image, the recognition module 13 does not need to be activated and the camera 19 does not need to be turned on. Based on this configuration, the portable electronic device 1 can save its power consumption since both the recognition module 13 and the camera 19 are in the power-saving mode, e.g. a turned-off mode, at this time. Otherwise, the recognition module 13 and the camera 19 can be activated if the main system 15 receives the actuation signal from the image sensor 11.

The instant disclosure relates to a surveillance system and a method thereof, and in particular to a surveillance system that can be implemented by the aspect of the aforementioned portable electronic device. More specifically, for achieving reduction of power consumption of a whole surveillance system, the surveillance system essentially adopts an auxiliary sensor that is an always-on sensor for monitoring an area to be under surveillance, and a main sensor that is woken up for performing surveillance function when any object of interest is found by the auxiliary sensor. An operation method of the surveillance system is also provided for implementing an aspect of multi-stage detection that can efficiently reduce power consumption.

Figure 3:
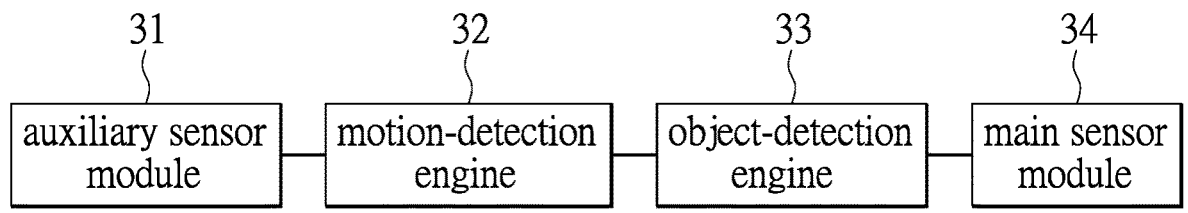
FIG. 3 shows a schematic diagram depicting a basic architecture of the surveillance system in one embodiment of the present disclosure.

Reference is next made to FIG. 3, which shows a schematic diagram depicting a basic architecture of the surveillance system in one embodiment of the present disclosure. In this embodiment of the present disclosure, the surveillance system is configured to be equipped with the devices, e.g. the devices described in FIG. 3, including hardware combined with firmware and/or software, provided by a security company that is in charge of maintaining an area under surveillance.

In the surveillance system, several main components such as an auxiliary sensor module 31, a motion-detection engine 32, an object-detection engine 33, and a main sensor module 34 are included.

The auxiliary sensor module 31 itself can be an independent auxiliary sensor that is an image sensor or a module that integrates a motion sensor and an image sensor. Further, the auxiliary sensor is especially an always-on sensor that is generally in full-time operation in a normal state. The auxiliary sensor module 31 is used to monitor the area to be under surveillance and generate sensed signals in a scene. The sensed signals generated by the auxiliary sensor are first buffered in a memory of the system for further analysis performed by an image processing process. When the auxiliary sensor module 31 outputs the sensed signals, the motion-detection engine 32 can detect a moving event in the scene based on the sensed signals. In one embodiment of the present disclosure, the auxiliary sensor module 31 can use a low-resolution image sensor that constantly captures the images, e.g. the sensed signals, of the scene. In one embodiment, the image sensor can collaborate with a motion detector. The motion detector such as an infrared sensor can function independently. Furthermore, for the purpose of motion detection, the auxiliary sensor module 31 can utilize a light source, e.g. an infrared device, that emits lights to create a Field of View (FOV) of the scene. It should be noted that the sensed signals can be the reflected light signals when any type of light source for the motion detector is employed.

In one aspect of the disclosure, the motion-detection engine 32 can be implemented by a series of software instructions executed by a processor of a hardware device. The motion-detection engine 32 can be an independent device in the system, or a hardware/software module, a circuitry, or an embedded system that is installed in the surveillance system. More specifically, the motion-detection engine 32 performs an early stage of recognition/analysis in the surveillance system. One of the objectives of the early stage of recognition made by the motion-detection engine 32 is to initially detect whether or not any object enters the area under surveillance. In the aspect of the present disclosure, it is not necessary to precisely recognize the object in this stage since the motion-detection engine 32 merely detects any activity in the area under surveillance based on the sensed signals provided by the auxiliary sensor module 31.

For example, the surveillance system can be configured to monitor any person entering the area under surveillance. However, the mentioned early stage of recognition or analysis is concerned merely with whether any movement is detected regardless of whether the source of movement is a person or an animal. In other words, the sensed signals generated by the low-resolution image sensor and/or the motion detector employed in the auxiliary sensor module 31 do not allow the system to recognize the object any more accurately.

Next, the object-detection engine 33 is used to detect an object in the scene based on the movement to be detected. Similarly, the object-detection engine 33 can be an independent device in the system, or a hardware/software module, a circuitry, or an embedded system that is installed in the surveillance system.

More specifically, the object-detection engine 33 is used to find a moving object in the scene based on the movement information generated by the motion-detection engine 32. Meanwhile, a frame-by-frame comparison based on image difference calculation can be used for motion detection. For example, a movement can be detected if the difference between adjacent frames or blocks in each frame is larger than a preset threshold. Therefore, the surveillance system can recognize the object to be targeted, and acknowledge the area occupied by the object through image processing process performed onto the sensed signals. The frame-by-frame calculation using the image signals allows the object-detection engine 33 to recognize the object. In one embodiment, the location of the image of the moving object can be recognized in the scene. Alternatively, the reflected light signals also allow the object-detection engine 33 to acknowledge the location of the object in the scene.

The main sensor module 34 of the surveillance system is generally in a power-saving mode when there is no object to be detected in the scene. In other words, the main sensor module 34 can be turned off, or stay in a sleep mode under a normal state when no moving object is recognized. However, the main sensor module 34 is activated to perform a specific surveillance function when at least one moving object or the location has been recognized by the object-detection engine 33.

Specifically, the main sensor module 34 can be a powerful sensor that consumes more power than the auxiliary sensor module 31. When the object has been detected/recognized in the scene under surveillance by any or both of the motion-detection engine 32 and the object-detection engine 33, the surveillance system generates an actuation signal for re-activating the main sensor module 34. The main sensor module 34 will take over the main surveillance task, such as, but not limited to, collecting surveillance data, performing object recognition, human facial recognition, and/or recording surveillance data in the scene when the moving object has been detected. In the meantime, the components such as the auxiliary sensor module 31, the motion-detection engine 32, and/or the object-detection engine 33 other than the main sensor module 34 can enter a power-saving mode.

In one embodiment of the present disclosure, the main sensor module 34 is not only an independent powerful sensor, but also a module that integrates the powerful sensor and a proprietary processor. For example, the powerful sensor is such as a high-resolution image sensor, and the processor can be a full-functional image processor. It is noted that the high-resolution image sensor is a relatively powerful sensor as compared with the low-resolution image sensor.

Figure 4:
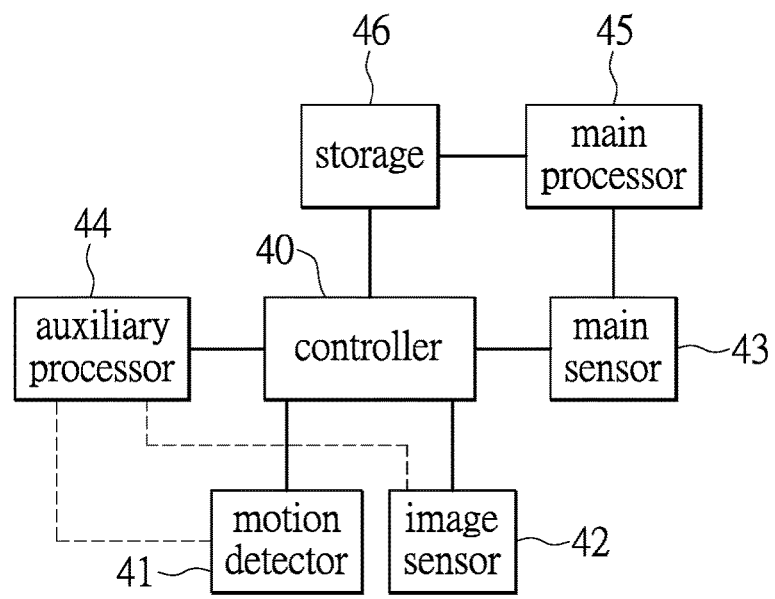
FIG. 4 shows another schematic diagram depicting the surveillance system in one further embodiment of the present disclosure.

FIG. 4 shows another schematic diagram depicting the surveillance system in one further embodiment of the present disclosure.

To embody the surveillance system described above, according to one of the embodiments of the present disclosure, the system includes a controller 40 that processes the signals produced by the various components of the surveillance system. The controller 40 can be implemented by a computer system that is placed at a specific location related to the area to be under surveillance, or an embedded system in the surveillance system. In the current embodiment, the mentioned auxiliary sensor module of the surveillance system can be implemented by a motion detector 41, an image sensor 42, and an auxiliary processor 44.

The motion detector 41 electrically connected with the controller 40 is used to detect a movement in the scene under surveillance. In view of the aforementioned embodiments, the motion detector 41 can be an infrared sensor or other types of light source that can emit electromagnetic waves for sensing any object in the scene based on the reflected signals. The motion detector 41 can collaborate with the image sensor 42 for detecting any dynamics in the scene.

In view of the aforementioned embodiments, the image sensor 42 electrically connected with the controller 40 can be a low-resolution image sensor that is used to capture the image of the moving object in the early stage of recognition. It should be noted that the low-resolution images allow the surveillance system to process the images efficiently in the early stage of the whole surveillance procedure. In this scenario, the system, e.g. the auxiliary processor 44, can speed up the image processing process of the low-resolution images. The auxiliary processor 44 electrically connected with the controller 40 can also be electrically connected to both the motion detector 41 and the image sensor 42.

The main sensor module 34 (as shown in FIG. 3) can be implemented by the main sensor 43 and the main processor 45. In view of the aforementioned embodiments, the main sensor 43 can be a high-resolution image sensor that produces high-resolution images, and the main processor 45 can be a full-functional processor that is capable of processing the high-resolution images.

According to one embodiment of the present disclosure, the auxiliary processor 44 generates an actuation signal when any moving object has been detected by the motion detector and/or the image sensor, or any object of interest has been detected. The controller 40 then receives the actuation signal and acknowledges that a movement or moving object has been found, and then the main sensor 43 and the main processor 45 are activated/re-activated by the controller 40 from the power-saving mode. The main sensor 43, e.g. the high-resolution image sensor, may collect huge surveillance data, e.g. the high-resolution images, and the main processor 45 will process the huge surveillance data. Such data can be stored to the storage 46 of the surveillance system.

According to one embodiment of the present disclosure, the surveillance system achieves reduction of power consumption if the main sensor module is in the power-saving mode at a normal state, but is activated when any moving object has been recognized; and optionally the auxiliary sensor module can also enter the power-saving mode when the main sensor module has been activated. The auxiliary sensor module employs the always-on sensor that is generally the low-resolution image sensor.

Further, the low-resolution images produced by the low-resolution image sensor may not be used to identify any object. Moreover, the low-resolution image sensor also downgrades the system's recognition rate since the low-resolution image sensor cannot handle the wide-angle field of view data for the area under surveillance. For example, the auxiliary sensor module with the low-resolution image sensor cannot recognize a human appearance especially if the person is at a distant location in the scene under surveillance. To solve the above-mentioned problem, the surveillance system in accordance with the present disclosure introduces an aspect of ROI (Region of Interest) to the object-detection engine.

Figure 5:
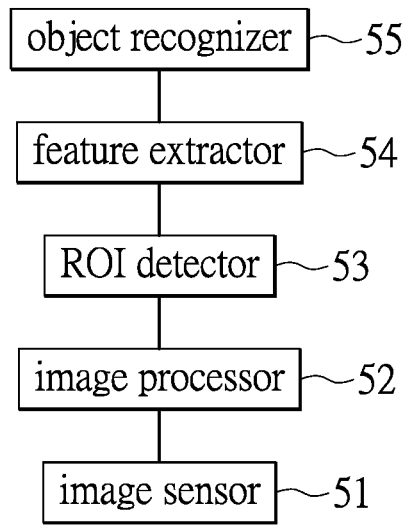
FIG. 5 shows a schematic diagram depicting a function of object detection implemented in the surveillance system in one embodiment of the present disclosure.

FIG. 5 shows a schematic diagram depicting a function of object detection implemented in the surveillance system in one embodiment of the present disclosure. In the current embodiment, the mentioned auxiliary sensor module adopts an image sensor 51 and an image processor 52. The image sensor 51 is exemplarily a low-resolution image sensor that captures low-resolution images of the scene under surveillance. The image processor 52 can be proprietarily used to process the low-resolution images produced by the image sensor 51, and then generate the image signals for further processing. It should be noted that an ROI detector 53, a feature extractor 54, and an object recognizer 55 are exemplarily the software-based or hardware-based modules that embody the object-detection engine of the surveillance system. The ROI detector 53, feature extractor 54, and object recognizer 55 are implemented by hardware or the software instructions executed by a processor of the surveillance system for detecting the object in the scene.

In the process of object detection, the ROI detector 53 is used to determine an ROI associated to the object of interest based on the low-resolution images. Once a movement has been detected, the aspect of Region of Interest allows the surveillance system to effectively capture the object of interest due to the limitation of the Field of View for the low-resolution image sensor, and also saves the processing time for the images. It should be noted that the main sensor module can accurately capture high-resolution images of the object of interest based on the location information of the low-resolution images provided by the auxiliary sensor module.

Figure 9A:
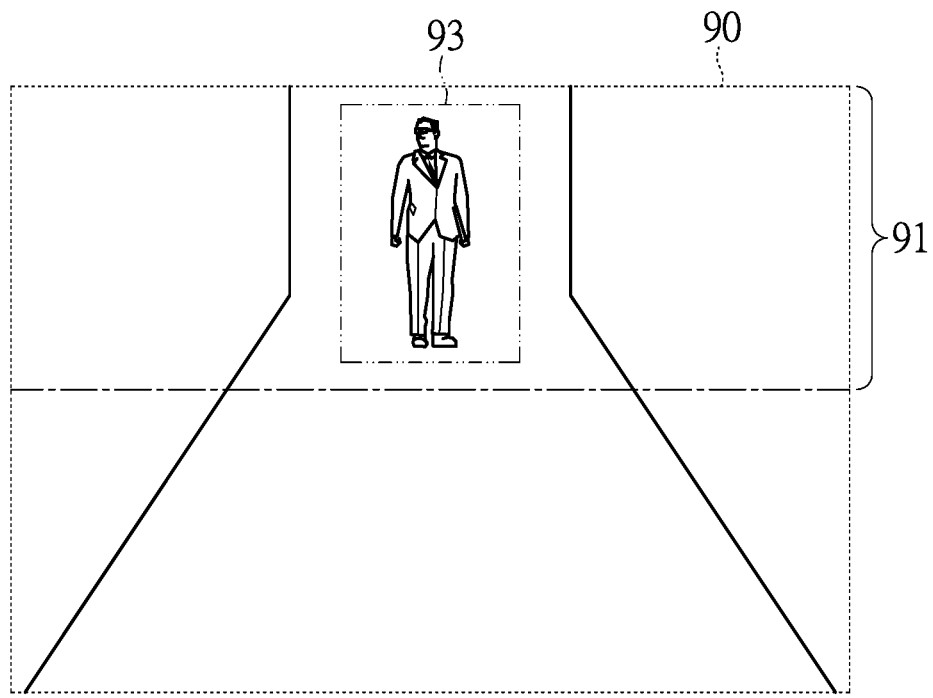
FIG. 9A and FIG. 9B schematically show the images taken by the auxiliary sensor module and processed by the object detection engine in one embodiment of the present disclosure.
Figure 9B:
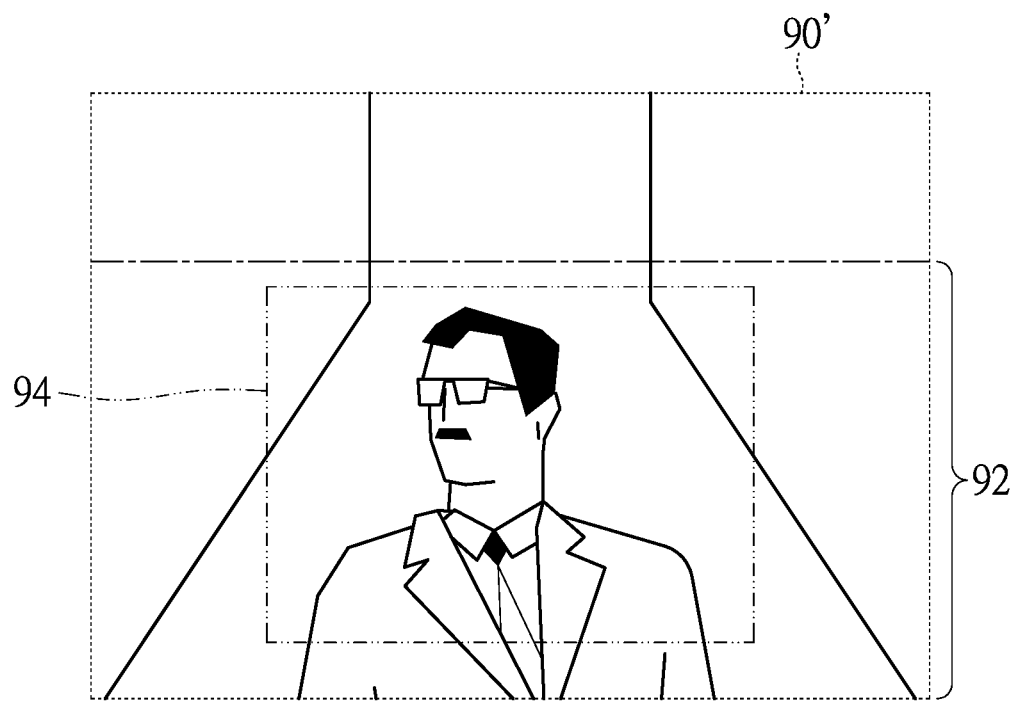

An exemplified ROI can be produced by processing an image analysis for searching one or more candidate objects in the scene, and afterwards identifying an ROI associated to the one or more candidate objects. For example, references are made to FIG. 9A and FIG. 9B describing exemplified ROIs. FIG. 9A schematically shows a first ROI 91 that indicates an upper-half region of a scene image 90 captured by the auxiliary sensor module of the surveillance system. The first ROI 91 can be identified based on the image information relating to an object, e.g. a first object 93 of interest, found by the object-detection engine from the scene image 90 in a distant region of the scene. FIG. 9B shows another circumstance of another target object, e.g. a second object 94, being found by the object-detection engine from the scene image 90'. Since the second object 94 is a near object rather than a distant object such as the first object 93 of FIG. 9A, a second ROI 92 indicative of a lower-half region can be identified under this circumstance.

In actual operation, the ROI may cover a full object within the scene, for example a full body of a human positioned at a distant location. Further, the ROI may only cover part of the object, for example an upper body of a human positioned at a near location. Since the ROI may cover a full object or part of the object, a corresponding detection algorithm can be used. For example, a software-implemented upper-half body detector can be used to identify the human in the scene when only part of the body is shown in the ROI. Since the ROI is identified when any candidate object has been found, the feature extractor 54 of the object-detection engine is next used to extract features in the ROI based on the images.

In one embodiment of the present disclosure, Haar-like features can be introduced to implement the feature extraction made by the feature extractor 54. It should be noted that the well-known Haar-like features are a kind of digital image features that are used in object recognition. Rather than the prior technique employing the image intensities, i.e. the RGB pixel values, for feature computation, the Haar-like features allows the system to process the feature extraction based on Haar wavelets. Through the Haar-like features, a plurality of adjacent rectangular regions at a specific location in the scene under surveillance are involved in the feature extraction. Specifically, the pixel intensities in each region are summed up, and the differences between these sums are then calculated. These differences are used to categorize subsections of the image of the scene. After that, the image of the object of interest can be found while checking the images recorded in a database. In the surveillance system, the aspect of Haar-like features can be used to extract the features of a human, e.g. an eye, a cheek, an ear, and/or a cheek, in the scene.

Further, in one another embodiment of the present disclosure, a histogram of oriented gradients (HOG) can be introduced for the feature extraction. The HOG is a feature descriptor used in image processing for the purpose of object detection. The technique counts occurrences of gradient orientation in localized portions of an image, e.g. the image of the scene under surveillance and is computed on a dense grid of uniformly spaced cells, using overlapping local contrast normalization for improved accuracy. In detail, the mechanism behind the HOG descriptor is that a local object appearance and a shape within an image can be described by the distribution of intensity gradients or edge directions. The HOG descriptor is thus particularly suitable for human detection in images as demanded by the present surveillance system.

The surveillance system then collects the outcome of the feature extraction process. An object recognizer 55 is then used to recognize the object in the scene according to the features extracted from the images.

For achieving object recognition, an aspect of machine learning can be introduced in the system. A Support Vector Machine (SVM) can be used since it incorporates supervised learning models with associated learning algorithms. SVM analyzes data used for classification and regression analyses, and the SVMs can efficiently perform a non-linear classification for implicitly mapping their inputs into high-dimensional feature spaces. The aspect of SVM can be introduced to the surveillance system in accordance with the present disclosure for implementing the object recognizer 55.

AdaBoost (adaptive boosting) is another machine learning technique that can be used to recognize an object in the scene under surveillance. AdaBoost can be used in conjunction with many other types of learning algorithms to improve their performance. AdaBoost is sensitive to noisy data and outliers, and in some problems it can be less susceptible to the overfitting problem than other learning algorithms. AdaBoost, with decision trees as the weak learners, is often referred to as the best out-of-the-box classifier. The AdaBoost algorithm is suitable for the purpose of object recognition in the surveillance system when the low-resolution images are provided in the early stage of the image recognition.

The object in the ROI can be recognized by one of the mentioned algorithms, and the object-detection engine outputs the recognized object in the scene. When the controller of the surveillance system receives the signal sent by the object-detection engine, the main sensor module will be activated.

The main sensor module, for example, includes a camera associated with the Digital Video Recorder (DVR), a closed circuit camera of a security system, or an IP camera that links to a network for delivering the recorded images to other devices. The main sensor module is capable of processing the images that are captured by the above-mentioned camera, for example a processor can be included in the main sensor module for processing the images. The images can be converted to the digital data stored in the storage of the system. In particular, rather than the auxiliary sensor module that is in full-time operation and constantly generating sensed signals from the scene, the main sensor module, including the camera, is generally in a power-saving mode/sleeping mode that consumes less resource when there is no object to be detected in the scene. Under a certain circumstance, the main sensor module is re-activated to perform surveillance function once the main sensor module receives a notification that an object is recognized from the auxiliary sensor module.

Figure 6:
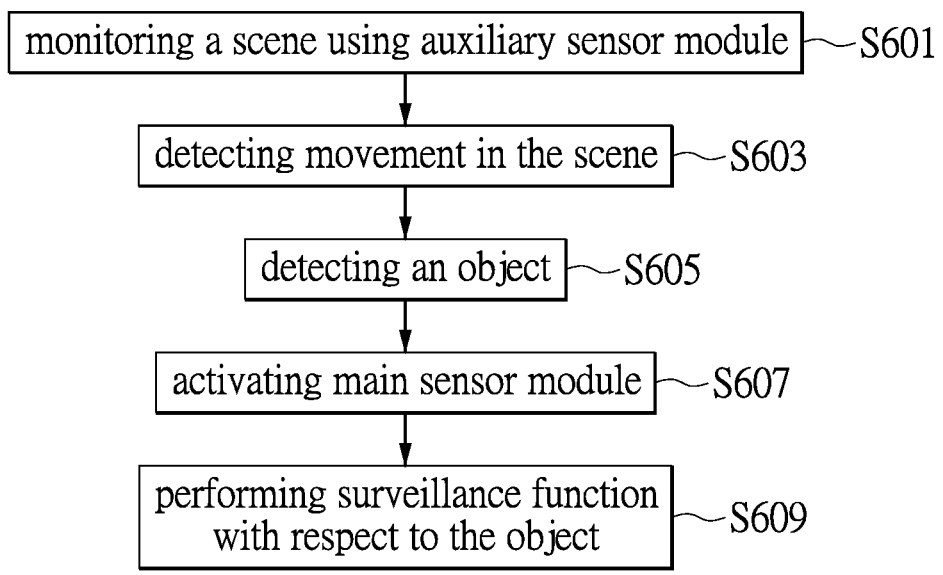
FIG. 6 shows a flow chart describing the operation method of the surveillance system in one embodiment of the present disclosure.

FIG. 6 shows a flow chart that exemplarily summarizes the operation method of the surveillance system in one embodiment of the present disclosure.

In the early stage, such as in step S601, the auxiliary sensor module of the surveillance system is used to monitor a scene under surveillance. In one embodiment, the auxiliary sensor module provides the sensor that is in full-time operation for constantly generating the sensed signals in the scene.

Next, in step S603, the motion-detection engine that can be a software-based or hardware-based tool is used to detect any movement in the scene. For example, the instructions of the motion-detection engine can be executed by a processor of the surveillance system for processing the sensed signals for detecting the movement. For example, the frame-by-frame calculation can be used to detect the movement. Once the movement has been determined, in next step S605, the software-based or hardware-based object-detection engine then detects any object in the scene based on the movement information. When the moving object has been confirmed by the system, such as in step S607, the main sensor module is activated. In step S609, the main sensor module performs a surveillance function with respect to the object. In the meantime, the auxiliary sensor module may still be in full-time operation, or according to one scenario, the auxiliary sensor module can enter the power-saving mode when the main sensor module has been activated for processing critical surveillance function.

Figure 7:
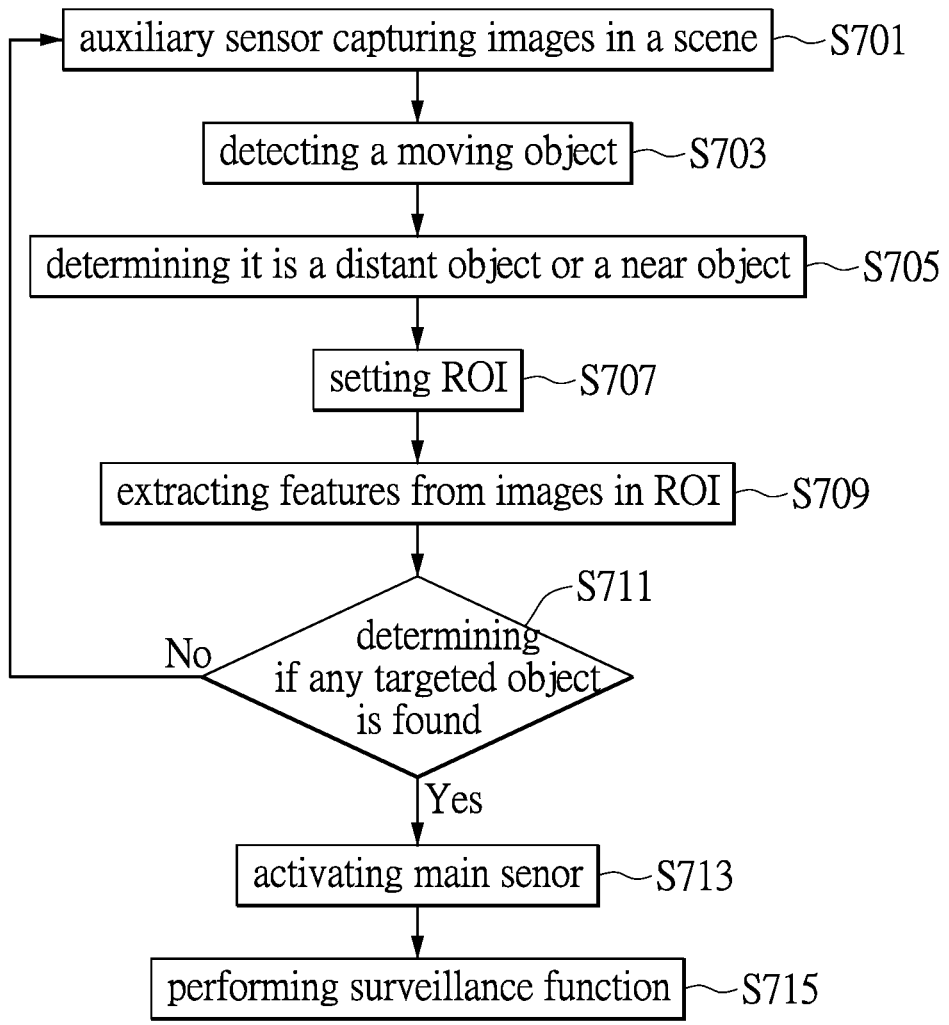
FIG. 7 shows one further flow chart describing the operation method of the surveillance system in one further embodiment of the present disclosure.

FIG. 7 shows another flow chart describing the operation method of the surveillance system in more detail, in which the auxiliary sensor module includes an auxiliary sensor, e.g. an image sensor, and the main sensor module includes a main sensor that is a high-resolution image sensor.

In step S701, the auxiliary sensor captures images in a scene, and the instructions stored in the memory of the surveillance system are executed to detect a moving object based on those images. Next, when the moving object has been detected, such as in step S705, the instructions are executed to determine if the object is a distant object or a near object. After that, in step S707, an ROI is determined according to the determination of a location of the object. For a non-limiting example, the ROI can be an upper-half region of the scene if the object is a distant object; or the ROI can be a lower-half region of the scene if the object is a near object. It should be noted that the coverage and/or the size of the ROI is determined based on how accurately the initial object image can be taken.

Reference is made to FIG. 9A and FIG. 9B, which schematically show the images taken by the auxiliary sensor module and processed by the object detection engine in one embodiment of the present disclosure. In FIG. 9A, the first ROI 91 is set based on the first object 93 that moves in the scene image 90 being found in a distant location. Otherwise, as in another scene image 90' is shown in FIG. 9B, the second ROI 92 is set based on the second object 94 being found in a near location. The locations of the objects 93, 94 cause the surveillance system to make different decision concerning the ROIs, e.g. the first ROI 91 and the second ROI 92.

Next, in step S709, the software-based or hardware-based feature extractor is used to extract features from images in the ROI, and in step S711, determines if any targeted object is found. It should be noted that the surveillance system will set up in the database regarding what the targeted objects are. If the object is not a targeted object, the process returns to step S701 and repeats the steps. If the object reaches a certain degree of similarity with a targeted object recorded in the database, the system continues a next step for activating the main sensor, such as in step S713. In step S715, the main sensor then captures the images associated to the targeted object, which is one of the critical surveillance functions.

Figure 8A:
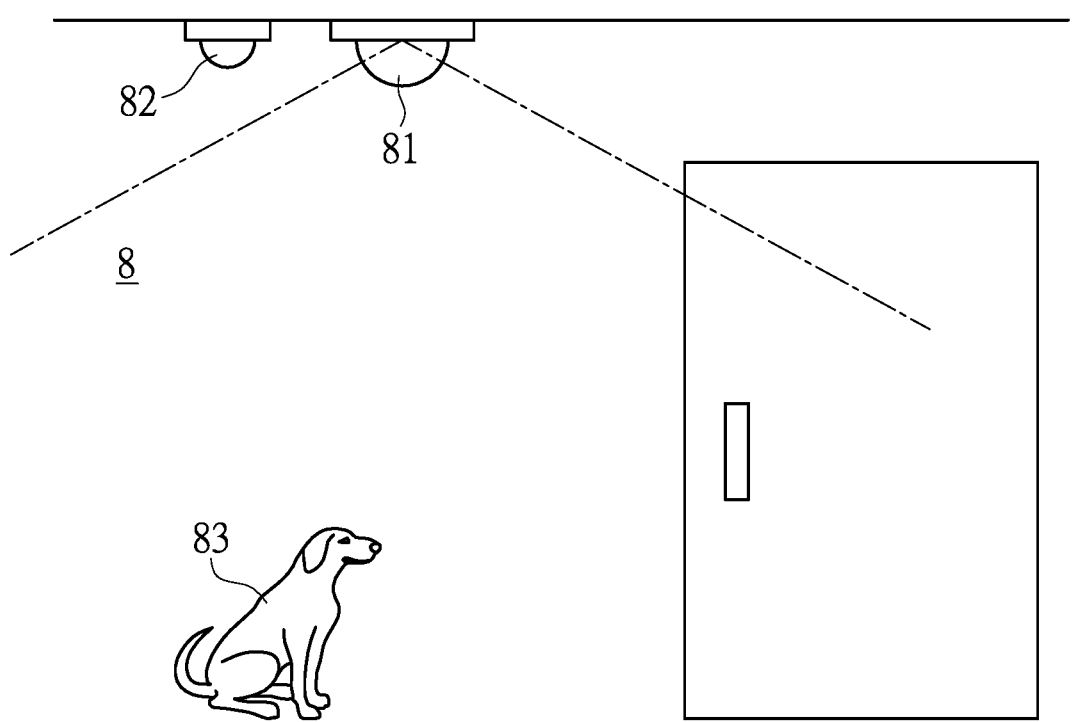
FIG. 8A and FIG. 8B schematically show a circumstance that embodies the operation method of the surveillance system in one embodiment of the present disclosure.
Figure 8B:
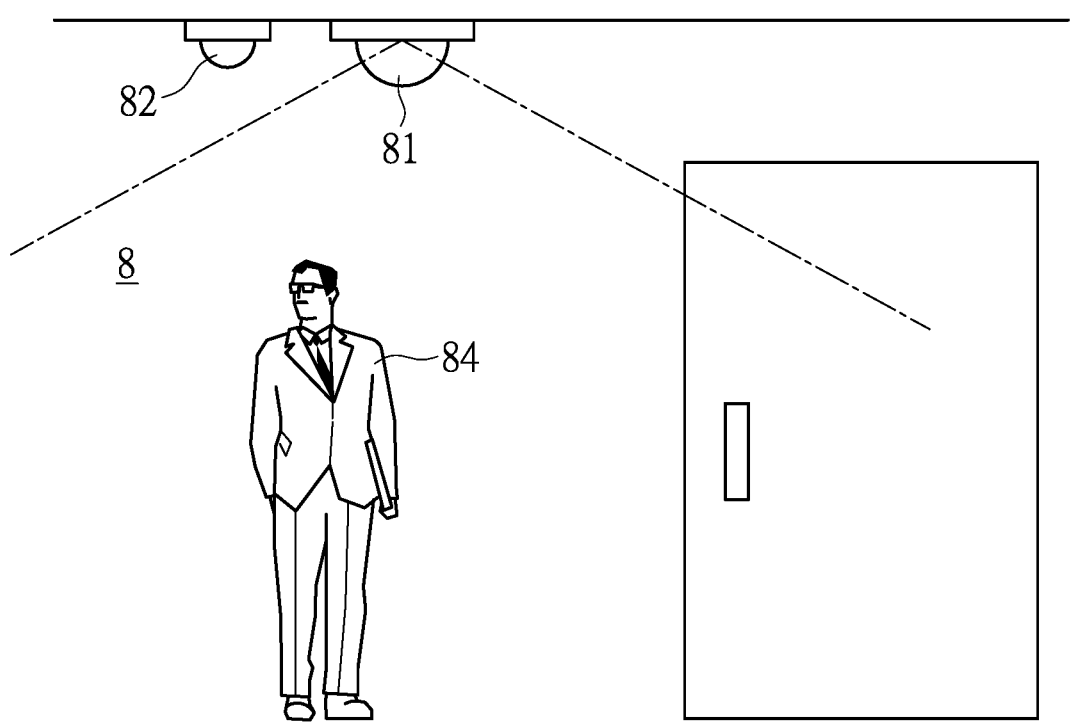

FIG. 8A and FIG. 8B schematically show a circumstance that embodies the operation method of the surveillance system in one embodiment of the present disclosure.

In the present example shown in FIG. 8A, two sensors 81, 82 are installed on a ceiling in a scene 8. The main sensor 81 is a full-functional and powerful sensor that performs a main task of the surveillance system. The auxiliary sensor 82 can be an always-on sensor that performs an early task in a full surveillance process ready for activating the main sensor 81. The main sensor 81 is interlocked with the auxiliary sensor 82. When the sensed signals generated by the auxiliary sensor 82 meets a specific criterion configured in the surveillance system, the main sensor 81 will be activated from its power-saving mode/sleeping mode.

For example, the scene 8 indicates a passage through a place, the main sensor 81 is a high-resolution camera, and the auxiliary sensor 82 is a low-resolution camera. The auxiliary sensor 82 is in full-time operation for monitoring the scene 8 and determining if any object enters an area under surveillance. The aforementioned embodiments show that the object can be recognized through the process of ROI detection, feature extraction, and object recognition. The main sensor 81 is then activated to capture the images of the scene 8, e.g. within an FOV when the object has been recognized to be a target object.

However, a first object 83 shown in the diagram is a dog. The dog entering the area under surveillance may not be a serious condition defined by the surveillance system in general. Therefore, the first object 83 is not a target object.

FIG. 8B shows that a second object 84 is a man, who may be a target object defined in the surveillance system. When the surveillance system confirms that the second object 84 is recognized to be a target object based on the sensed signals made by the second sensor 82, the first sensor 81 will be activated for performing the critical surveillance function.

To sum up, the surveillance system in accordance with the present disclosure mainly includes an auxiliary sensor module that is in full-time operation for generating the sensed signals in an early stage, and a main sensor module that is in a power-saving mode at a normal state, e.g. when no security event occurs. The main sensor module can be activated to perform a critical surveillance function when the surveillance system acknowledges a security event detected by the auxiliary sensor module. The surveillance system effectively reduces power consumption since the powerful main sensor module only works when the detection result meets at least one criterion defined by the surveillance system.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A surveillance system, comprising:
   an auxiliary image sensor module being an always-on sensor that integrates a low-resolution image sensor that is in full-time operation for capturing low-resolution images and that outputs sensed signals from a scene;
   a motion-detection engine that is included in the auxiliary image sensor module and is used to detect a movement in the scene based on the sensed signals outputted from the low-resolution image sensor of the auxiliary image sensor module;
   a human-detection engine that is included in the auxiliary image sensor module and is used to detect a human in the scene based on the sensed signals outputted from the low-resolution image sensor after the movement is detected by the motion-detection engine; wherein human-detection engine detects whether or not the human enters the scene based on the movement information generated by the motion-detection engine via different ROIs in one low-resolution image in which one of the ROIs covers a full body of the human within the scene at a distant location, and/or another ROI covers part of the human at a near location; and
   a main image sensor module, implemented by a main sensor being a high-resolution sensor and a main processor, that is in a power-saving mode when there is no human to be detected in the scene, and that is activated to perform a surveillance function for collecting surveillance data, performing object recognition, human facial recognition, and/or recording surveillance data in the scene when the human is detected by the human-detection engine.

2. The system as recited in claim 1, wherein the auxiliary image sensor module includes an auxiliary processor.

3. The system as recited in claim 1, wherein the motion-detection engine or the human-detection engine is implemented by hardware or a series of software instructions executed by a processor of the surveillance system.

4. The system as recited in claim 3, wherein the human-detection engine includes:
   an ROI detector, used to determine the ROI based on images captured by an image sensor of the auxiliary image sensor module;
   a feature extractor, used to extract features in the ROI based on the images; and
   an object recognizer, used to recognize the human in the scene according to the features extracted from the images;
   wherein, via an output, the human-detection engine outputs the recognized human in the scene for activating the main image sensor module.

5. The system as recited in claim 1, wherein the main processor is an image processor.

6. An operation method of a surveillance system, comprising:
   detecting a movement in a scene based on signals sensed by a motion-detection engine included in an auxiliary image sensor module being an always-on sensor that integrates a low-resolution image sensor which is in full-time operation for capturing low-resolution images of the scene;
   determining one or more ROIs based on the low-resolution images;
   extracting features in the ROI based on the images;
   recognizing a human in the scene by a human-detection engine included in the auxiliary image sensor module according to the features extracted from the low-resolution images; wherein human-detection engine detects whether or not the human enters the scene based on the movement information generated by the motion-detection engine via different ROIs in one low-resolution image in which one of the ROIs covers a full body of the human within the scene at a distant location, and/or another ROI covers part of the human at a near location;
   outputting the recognized human in the scene;
   detecting a moving object in the scene based on the movement to be detected; and
   activating a main image sensor module from a power-saving mode for performing surveillance function when the moving object is detected by the auxiliary image sensor module, in which the main image sensor module is in the power-saving mode when there is no human to be detected in the scene.

7. The method as recited in claim 6, wherein the auxiliary image sensor module enters a power-saving mode when the main image sensor module has been activated.

8. The method as recited in claim 6, wherein the ROI is determined according to a determination of a location of the human.

9. The method as recited in claim 8, wherein a size and/or coverage of the ROI is determined based on image information related to the human.

10. The method as recited in claim 9, wherein the ROI is an upper-half region of the scene if the human is at a distant location; and the ROI is a lower-half region of the scene if the human is a near object.

11. The method as recited in claim 6, wherein the step for detecting the movement in the scene is implemented by hardware or a series of software instructions executed by a processor of the surveillance system, and is to detect whether or not any human enters the scene and to find a moving object in the scene.

12. The method as recited in claim 6, wherein the main image sensor module includes a high-resolution image sensor that captures high-resolution images of the scene.

13. A surveillance system, comprising:
    an auxiliary image sensor module being an always-on sensor that integrates an auxiliary processor, and a low-resolution image sensor that is in full-time operation for taking low-resolution images and that outputs sensed signals from a scene;
    a motion-detection engine that is included in the auxiliary image sensor module and is used to detect a movement in the scene based on the sensed signals outputted from the low-resolution image sensor of the auxiliary image sensor module;

a human-detection engine that is included in the auxiliary image sensor module and is used to detect a human in the scene based on the sensed signals outputted from the low-resolution image sensor after the movement is detected by the motion-detection engine; wherein human-detection engine detects whether or not the human enters the scene based on the movement information generated by the motion-detection engine via different ROIs in one low-resolution image in which one of the ROIs covers a full body of the human within the scene at a distant location, and/or another ROI covers part of the human at a near location;

a controller receiving signals sent by the human-detection engine; and a main image sensor module, implemented by a main sensor being a high-resolution sensor and a main processor, that is in a power-saving mode when there is no human to be detected in the scene, and that is activated to perform a surveillance function for collecting surveillance data, performing object recognition, human facial recognition, and/or recording surveillance data in the scene when the human is detected by the human-detection engine;

wherein, the auxiliary processor generates an actuation signal when any moving object is detected by the low-resolution image sensor; the controller activates the main image sensor module from the power-saving mode if the controllers receives the actuation signal and acknowledges that a movement or the moving object is found.

14. The system as recited in claim 13, wherein the human-detection engine includes:

an ROI detector, used to determine the ROIs based on images captured by an image sensor of the auxiliary image sensor module;

a feature extractor, used to extract features in the ROI based on the images; and an object recognizer, used to recognize the human in the scene according to the features extracted from the images;

wherein, via an output, the human-detection engine outputs the recognized human in the scene for activating the main image sensor module.

* * * * *